United States Patent

[11] 3,622,004

| | | |
|---|---|---|
| [72] | Inventor | Gene A. Meyer<br>West Simsbury, Conn. |
| [21] | Appl. No. | 874,624 |
| [22] | Filed | Nov. 6, 1969 |
| [45] | Patented | Nov. 23, 1971 |
| [73] | Assignee | Chandler Evans Inc.<br>West Hartford, Conn. |

[54] RECIRCULATING WASH FLOW FILTER
9 Claims, 5 Drawing Figs.

[52] U.S. Cl. ..................................... 210/134,
210/136, 210/409, 210/433, 210/456
[51] Int. Cl. ..................................... B01d 35/22,
B01d 29/42
[50] Field of Search ........................................... 210/304,
305, 409, 433, 456, 130, 134, 136, 452

[56] References Cited
UNITED STATES PATENTS

| | | | | |
|---|---|---|---|---|
| 1,903,774 | 4/1933 | Burrell | | 210/130 |
| 2,068,048 | 1/1937 | Adams | | 210/304 X |
| 2,658,623 | 11/1953 | Thornhill | | 210/409 |
| 3,067,876 | 12/1962 | Hruby, Jr. | | 210/304 X |
| 3,307,336 | 3/1967 | Dewsberry | | 210/304 X |
| 3,353,678 | 11/1967 | Dragon | | 210/433 X |

*Primary Examiner*—Frank A. Spear, Jr.
*Attorney*—R. W. Luther

ABSTRACT: A cylindrical wash flow fuel filter element is mounted in a housing so as to form a flow recirculation path, a portion of which is parallel to the surface of the filter. Fluid enters an inlet and passes through a jet inducer nozzle which accelerates the fluid inducing a flow in the recirculation path. Contaminants are washed away from the surface of the filter and held in suspension by the wash flow in the recirculation path. One of two outlets receives filtered fluid which passes through the filter element. The other outlet communicates with the recirculation path via a pressure responsive shutoff valve. An auxiliary check valve limits the pressure drop across the jet inducer nozzle for high inlet flow conditions. When the pressure responsive shutoff valve is closed, filtered flow equal to that entering the jet inducer emerges radially from the wash flow filter and the contaminant is, for a limited time, stored in the recirculating wash flow path. When the pressure responsive shutoff valve is opened the wash flow passes through the other outlet thereby discharging the stored suspended contaminants.

INVENTOR
GENE A. MEYER
BY Radford W. Luther
ATTORNEY

RECIRCULATING WASH FLOW FILTER

BACKGROUND OF THE INVENTION

This invention relates to fluid filters and more particularly to fuel filter devices which utilize a wash flow to cleanse the filter element of impurities which adhere thereto.

Conventional filters act as barriers to entrap contaminants in a fluid passing therethrough. Continued use of such a filter will eventually result in an accumulation of contaminants on the filter that will hinder the flow therethrough and thus necessitate cleaning or replacement of the filter element.

A prior art solution to the aforementioned problem is to direct a high-velocity stream of wash flow at right angles to the flow of fluid through the filter, the wash flow being that flow which passes over the filter element but not through it. Contaminants adhering to the surface of the filter element are exposed to the high-velocity wash flow which tends to wash away and entrain the accumulated contaminants. If, however, the wash flow is intermittently applied to the surface of the filter element the contaminants are likely to enter the filter element and remain therein. These contaminants within the filter element are not removable by the wash flow and thus subsequent accumulations are likely to impede flow through the filter.

Certain filter applications require "dead heading" the flow through the filter; i.e., respectively forcing all the flow through the filter element and subsequently restoring the wash flow. Manifestly, if this flow alternation is recurrent contaminants will progressively accumulate within the filter, as explained heretofore, and thus impair the filtered flow capacity thereof and ultimately render the filter inoperative. Prior art wash filters, which embody a reasonably sized filter element, are incapable of performing adequately after being subjected to a large number of dead head cycles because of the difficulties alluded to above. Also, if contaminated fuel is the fluid and the "dead heading" is performed over a two second interval, the filter element is likely to become clogged.

SUMMARY OF THE INVENTION

This invention permits the inclusion of a reasonably sized filter element in a wash flow device by providing structure that continuously directs a wash flow over the filter element during periods when the entire filtered output flow is equal to the inlet flow.

A housing having a chamber has an inlet and an outlet which respectively communicate with the sides of a filter element mounted within the chamber. A contaminated flow recirculation path is formed within the chamber by the filter element and the housing. The contaminated flow passes through the filter element at right angles to the wash flow in the recirculation path to emerge as filtered flow. Thus, the filtered outlet flow can equal the contaminated flow entering through the inlet. The recirculated flow in the recirculation path functions both as a wash flow and as a storage medium for the contaminants entrained thereby. A subsequent porting of the contaminated fuel from the chamber causes the stored contaminants to be flushed out.

The filter device of the invention is also distinguishable from prior art wash flow filters in that a jet pump is employed to induce a recirculating wash flow within the device so as to make possible a filtered flow equal to a contaminated inlet flow and enhance the ratio of wash flow to filtered flow when wash flow is permitted to discharge from the device. The filter device of the invention is unique because it is capable of operating over extended periods without necessitating an excessive discharge of wash flow.

Accordingly it is a primary object of the invention to provide a wash flow filter device that allows a filtered output flow to equal an contaminated input flow for reasonable periods of time.

Another object is to provide a filter device in which the wash flow acts as a storage medium for accumulated contaminants when filtered output flow equals contaminated inlet flow.

Yet another object is to provide a filter device which includes a means to induce a recirculating wash flow during periods in which filtered output flow equals contaminated inlet flow.

A further object is to provide a filter device which incorporates a jet inducer to establish a recirculating wash flow therein.

Further objects and advantages of the invention will become readily apparent from the following detailed description of the preferred embodiments of the invention taken in conjunction with the accompanying drawings.

DETAILED DESCRIPTION OF PREFERRED EMBODIMENTS

Figure 1:
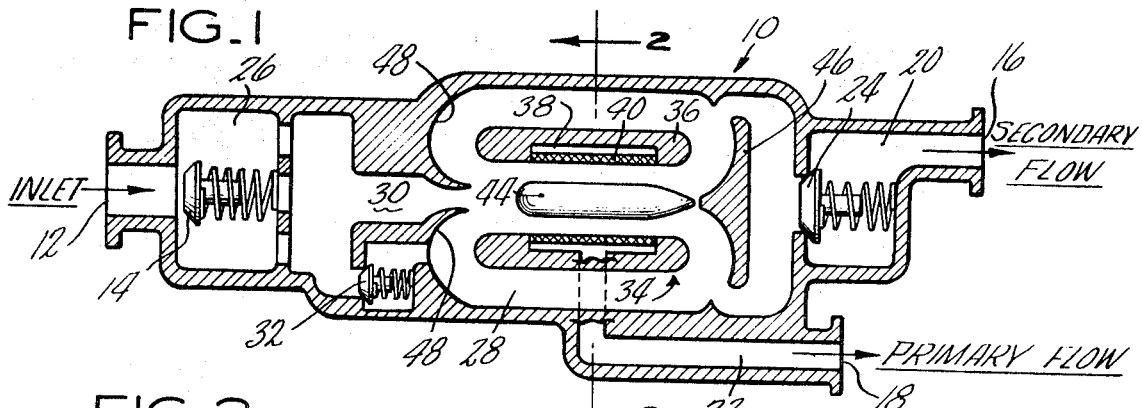
FIG. 1 is a schematic view of a preferred embodiment of a filter device according to the invention.

FIG. 1 shows an embodiment of a wash flow filter device according to the invention which essentially functions as a flow divider valve. The valving thereof is illustrated in the primary flow condition wherein the secondary flow is deadheaded.

A housing generally indicated at 10 has an inlet 12 at one end thereof which is closeable by means of a spring loaded shutoff valve 14. At the other end of housing 10 are two outlets from which respectively emanate a contaminated (unfiltered) secondary flow and a primary (filtered) flow. First and second outlet conducts 20 and 22 respectively fluidly communicate with the outlets 16 and 18. A secondary flow spring-loaded shutoff valve 24 is disposed within conduit 20 to prevent a contaminated outlet flow therein.

A passage 26, in series flow relationship with inlet 12, contains a mounting structure for shutoff valve 14. Passage 26 communicates with a chamber 28 via jet inducer nozzle 30, positioned at the entrance thereof, and via an auxiliary check valve 32. The function of the valve 32 is to forestall the development of a large pressure differential across nozzle 30 during high inlet flows by partially bypassing the inlet flow.

Chamber 28 contains a filter assembly generally indicated at 34. Assembly 34 comprises a generally cylindrical filter element mounting structure 36 with a circumferential recess 38 therein. A porous filter element 40 is fixedly mounted in the recess 38 in such a manner that its inner surface is flush with the interior surface of the structure 36. Filter element 40 occupies only a portion of recess 38 so that an annulus 42 is defined by the radial spacing between the outer surface of filter element 40 and the interior of the recess 38. This annulus communicates with first outlet conduit 22. Radial struts 42 and 43 interconnect mounting structure 36 and housing 10 to provide support for the mounting structure. A plug 44, shaped as an elongated body of revolution, is radially spaced from the inner surface of the filter element and disposed along the longitudinal axis of the filter assembly concentric with filter element 40. The plug serves to further accelerate the flow emanating from nozzle 30, such that a high-velocity wash stream effected thereby, will scrub away and entrain the contaminants adhering to the inner surface of the filter element 40. A substantially circular flow deflector 46 is aligned with plug 44 to deflect the high-velocity wash flow enveloping plug 44 around the right end of the filter element mounting structure 36 into an annular flow path defined by the exterior surface of the mounting structure and the interior of housing 10. The curved interior walls 48 of housing 10 adjacent nozzle 30 deflect flow from the annular flow path so that it again proceeds in its original direction through the filter assembly. Obviously, the size of the passage defined between walls 48 and the mounting structure is determined by jet pump principles, well known to those skilled in the art.

From the foregoing, it will be seen that a closed loop recirculation path is defined by the filter assembly 34 and housing 10 and that a flow recirculation will be effected in the path even though shutoff valve 24 be closed.

In operation contaminated fluid enters inlet 12 and thence passes shutoff valve 14 into passage 26. The fluid then passes into nozzle 30 where it is accelerated and directed into chamber 28. Fluid flowing past plug 44 (wash flow) is accelerated further thereby so as to engender additional scrubbing action to remove contaminants from the inner surface of filter element 40. Flow deflector 46 then causes the wash flow to undergo a reversal in direction and proceed along the annular path between the exterior of mounting structure 36 and housing 10. Walls 48 again produce a flow reversal and the flow once more proceeds towards the interior of the filter assembly.

When a sufficient pressure develops in chamber 28, secondary shutoff valve 24 will open causing a secondary flow in conduit 20 which carries away the contaminants which have progressively accumulated in the wash flow.

It will be noted that operation of the device with the secondary shutoff valve in the open position will result in a favorable increase in the wash to filtered flow ratio due to the action of the jet inducer nozzle 30.

If high inlet flow conditions are encountered, the pressure differential between passage 26 and chamber 28 will increase until auxiliary check valve 32 opens to limit this pressure differential. Opening of the auxiliary check valve permits a partial bypassing of jet inducer nozzle 30.

Figure 2:
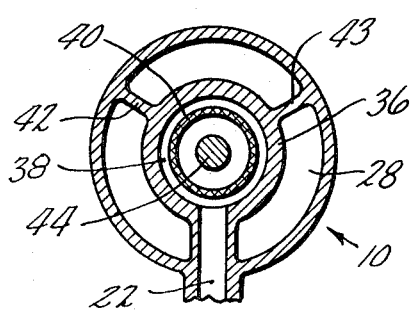
FIG. 2 is a sectional view of the filter device of FIG. 1 taken on the line 2–2.
Figure 4:
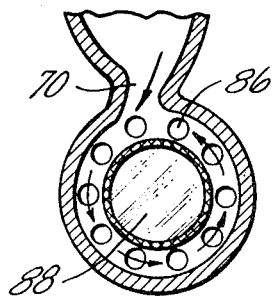
FIGS. 4 and 5 are sectional views of the filter device of FIG. 3 taken on the lines 4–4 and 5–5 respectively.
Figure 5:
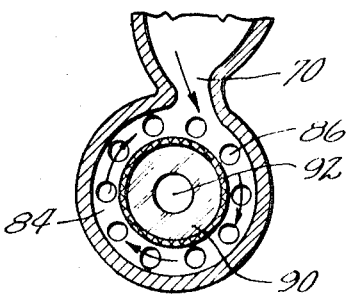
Figure 3:
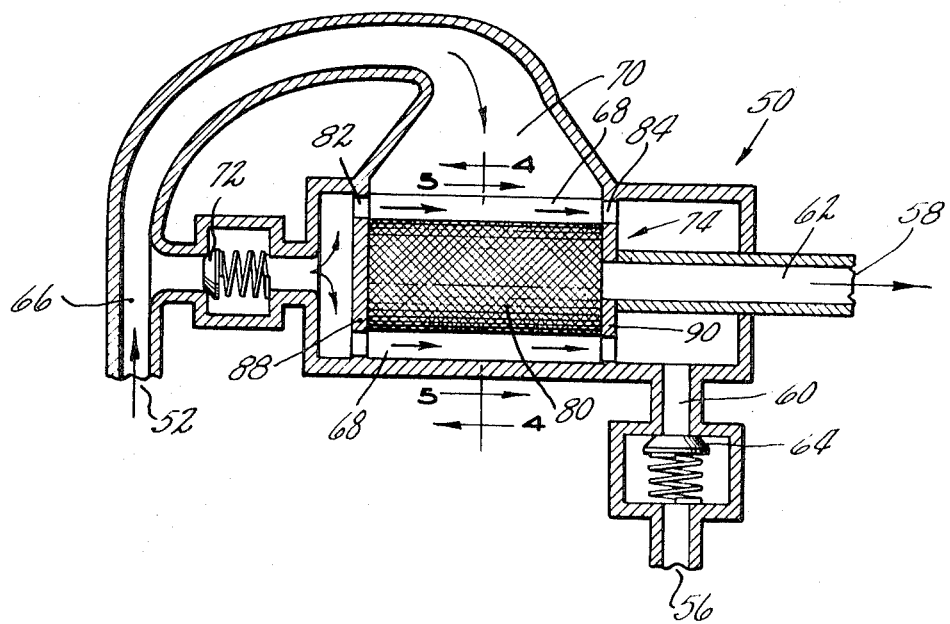
FIG. 3 is a schematic view of another preferred embodiment of a filter device according to the invention.

Referring now to FIGS. 3-5 a second embodiment of the invention is shown which operates on the same principle as that of the embodiment of FIGS. 1-2, but differs therefrom in construction.

A housing generally indicated at 50 has an inlet 52 at one end thereof and two outlets 56 and 58 at the other end thereof from which a primary (filtered) flow and a secondary (contaminated) flow respectively issue forth. First and second outlet conduits 60 and 62 respectively fluidly communicate with the outlets 56 and 58. A secondary flow spring-loaded shutoff valve 64 is disposed within conduit 60 to prevent a contaminated outlet flow therein.

A passage 66, in series flow relationship with inlet 52, communicates with a chamber 68 in housing 50 by means of a canted jet inducer nozzle 70 and an auxiliary check valve 72, which functions exactly as auxiliary check valve 32, of the embodiment of FIG. 1.

Chamber 68 contains a filter assembly generally indicated at 74. Assembly 74 comprises a generally cylindrical filter element 80 fixedly mounted in chamber 68 by annular mounting rings 82 and 84, each mounting ring having a plurality of apertures 86. At the ends of filter element 80 are secured covers such as discs 88 and 90, disc 90 having a centrally disposed opening 92 for communicating filtered fluid within filter element 80 to second outlet conduit 62. Discs 88 and 90 are sealingly affixed to the interior peripheries of rings 82 and 84 respectively. As is evident from a study of FIGS. 3-5, a closed loop circumferential flow recirculation path is defined by housing 50, the outer surface of filter element 80 and mounting rings 82 and 84.

In order to induce a flow recirculation in the space between the outer surface of filter element 80 and housing 50, nozzle 70 is canted towards a side of filter element 80 as is clearly shown in FIGS. 4 and 5. The small arrows in FIGS. 4 and 5 denote the direction of the recirculating flow of unfiltered fluid in the recirculation path when shutoff valve 64 is closed.

Apertured rings 82 and 84 provide respective flow paths for unfiltered fluid entering the chamber 68 from auxiliary check valve 72 and issuing from the chamber to outlet 56.

Contaminated flow enters the chamber 68 and impinges upon the cylindrical filter element 80 at a tangent to the diameter thereof. The incoming jet of flow acts as an inducer and recirculates, in a circumferential direction, the volume of fluid surrounding the outer surface of filter element 80. Contaminants are stored in this swirling fluid during the period in which filtered output flow through outlet 58, equals contaminated inlet flow through inlet 52. During this period, clean fuel emerges from the inner surface of filter element 80 and thence passes to outlet 58 via opening 92 and conduit 62.

Upon the opening of the auxiliary check valve a supplementary wash flow commences in an axial direction through the recirculation path. The mixing of the circumferential and axial flows within the recirculation path generates turbulence therein which causes a scrubbing action on the outer surface of filter element 80, this action being conductive to efficient operation of the filter device. The auxiliary check valve normally opens after the shutoff valve 64 opens. Upon the opening of shutoff valve 64, the stored contaminants in the recirculating wash flow are flushed out through outlet 56.

It will be appreciated that the two embodiments described heretofore operate in essentially the same manner save for the differences between the respective streamlines of recirculating wash flow. In this respect, it will noted that the wash flow in the embodiment of FIGS. 3-5 follows a generally circular path and thus functions in a manner somewhat analogous to that of a centrifuge, inasmuch as the contaminants in the wash flow are driven outwardly from the filter surface by centrifugal force. This effect additionally aids in preventing the contaminants in the unfiltered fluid from adhering to the surface of the filter element.

While I have described my invention as being particularly well adapted for use in fuel systems, it is to be understood that it is equally well adapted for other fluid systems. It will also be understood that the preferred embodiments shown in the drawings are merely illustrative and not limiting, as many modifications may be made therein without departing from the spirit and scope of my invention. For example, the jet nozzle of either embodimemt could be replaced by gear pump, vane pump, centrifugal pump or other flow inducer. In FIG. 1 the cylindrical filter element could be replaced by a single planar filter element. Further, the two outlets of either embodiment could be merged into a single outlet.

I claim as my invention:

1. A recirculating wash flow filter device comprising:

a housing having a chamber therein, a fluid inlet for receiving unfiltered fluid, a first outlet conduit for carrying filtered fluid from said chamber, and a second outlet conduit for carrying unfiltered fluid from said chamber, said inlet and said outlet conduits being in respective fluid communication with said chamber;

a filter assembly, including a porous filter element with an outer surface and an inner surface, mounted within said chamber, said filter assembly and said housing defining a closed loop unfiltered flow recirculation path within said chamber;

valve means responsive to the pressure in said chamber to move between closed and open positions to respectively prevent and permit a flow of unfiltered fluid in said second outlet conduit, said valve means increasing the wash flow to filtered flow ratio when in the open position;

a jet inducer nozzle located at the entrance to said chamber and oriented to direct unfiltered fluid emanating therefrom toward said filter assembly over one of said surfaces and into said recirculation path, filtered fluid from the other said said surfaces being directed to said first outlet conduit, said nozzle being adapted to induce a recirculating wash flow of unfiltered fluid in said recirculation path such that contaminants present in the unfiltered fluid will be entrained and stored in the wash flow when said valve means is closed; and passage means to communicate flow of unfiltered fluid from said inlet to said nozzle.

2. The device defined in claim 1, wherein said passage means is remote from said recirculation path.

3. The device defined in claim 1, wherein said filter element is generally cylindrical and is radially spaced from said housing such that said flow recirculation path is defined therebetween; and wherein said filter assembly further comprises:
- a cover sealingly secured to an axial end of said filter element around the periphery thereof; and
- another cover having an opening therein provided at the other axial end of said filter element to establish fluid communication with said first outlet conduit.

4. The device defined in claim 3, further including:
a pair of rings, each having a plurality of apertures, mounted adjacent the axial ends of said filter element around the periphery thereof, the extreme radial extremities of said rings abutting the housing.

5. The device defined in claim 1, in which said nozzle is in axial alignment with said filter assembly.

6. The device, defined in claim 1, in which the axis of said nozzle is canted with respect to said filter assembly.

7. The device, as defined in claim 1, further including:
means to limit the pressure differential between said passage means and said chamber by bypassing flow from said passage means and said chamber by bypassing flow from said passage means into said recirculation path.

8. A recirculating wash flow filter device comprising:
- a housing having a chamber therein and a fluid inlet and a fluid outlet, said inlet and said outlet being in respective fluid communication with said chamber;
- a filter assembly having a porous filter element, with an outer surface and an inner surface, mounted within said chamber, said filter assembly and said housing at least partially defining an unfiltered flow recirculation path within said chamber, said filter assembly comprising: an elongated body of revolution radially spaced from said filter element, said filter element being essentially cylindrical and surrounding said body so as to be concentric therewith, and a generally cylindrical filter-element-mounting structure with a circumferential recess therein, said filter element being mounted in said recess with said inner surface genera/ly flush with said structure and said outer surface radially spaced from said structure to form an annulus therebetween, said annulus being in communication with said outlet;
- means to induce a recirculating flow of unfiltered fluid in said recirculation path;
- means to communicate a flow of filtered fluid from said assembly to said outlet; and
- passage means to communicate flow of unfiltered fluid from said inlet to said flow-inducing means.

9. A recirculating wash flow filter device comprising:
- a housing having chamber therein and a fluid inlet and a fluid outlet, said inlet and said outlet being in respective fluid communication with said chamber;
- a filter assembly having a porous filter element, with an outer surface and an inner surface, mounted within said chamber, said filter assembly and said housing at least partially defining an unfiltered flow recirculation path within said chamber;
- a jet inducer nozzle located at the entrance to said chamber in axial alignment with said filter assembly, to induce a recirculating flow of unfiltered fluid in said recirculation path;
- means to communicate a flow of filtered fluid from said assembly to said outlet; and
- passage means to communicate a flow of unfiltered fluid from said inlet to said flow-inducing means.

* * * * *